Jan. 24, 1956  G. A. LYON  2,732,261
WHEEL COVER
Filed Sept. 11, 1952
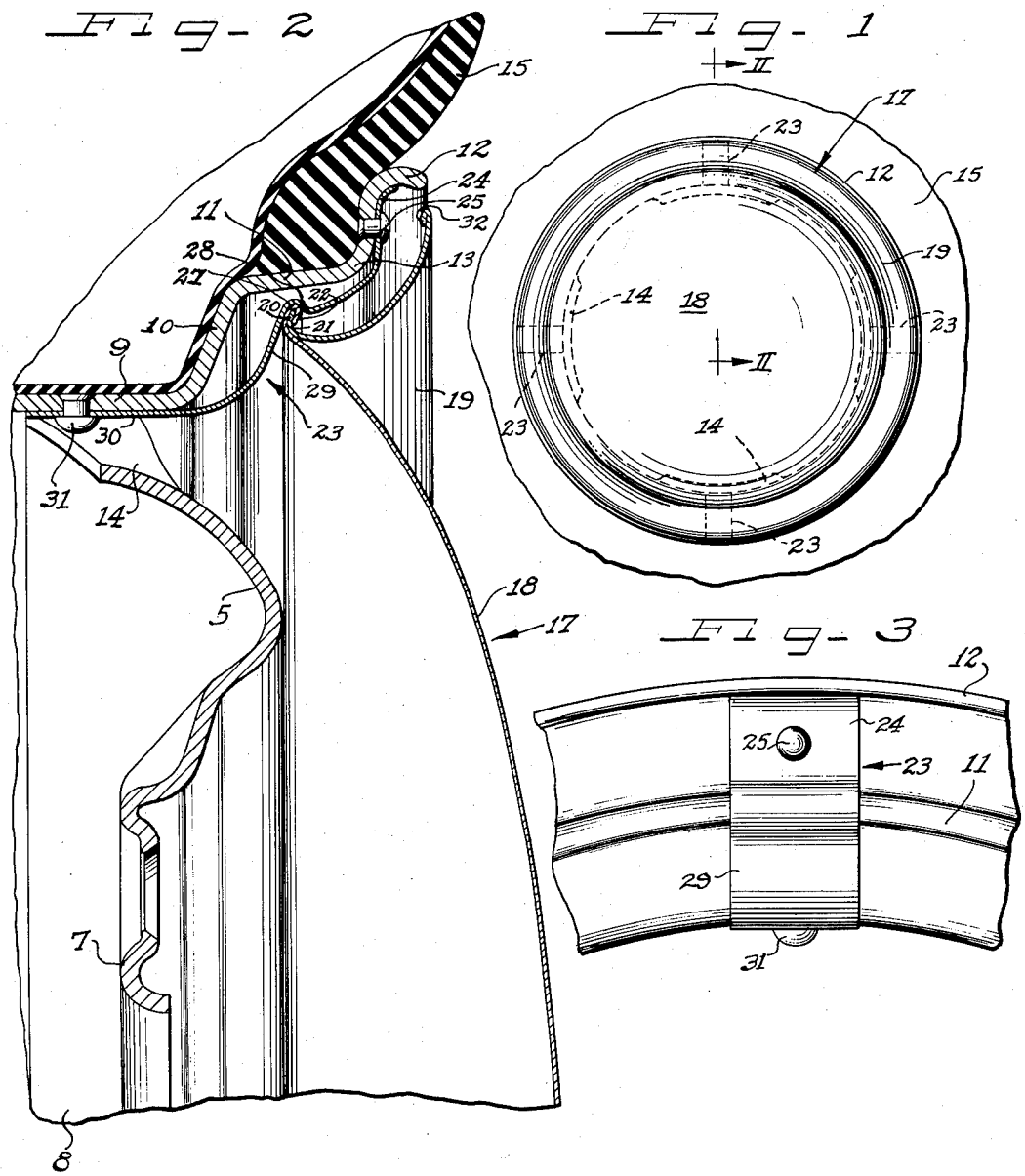
Inventor
George Albert Lyon
by Hill, Sherman, Meroni, Gross & Simpson
Attys United States Patent Office 2,732,261
Patented Jan. 24, 1956

2,732,261

WHEEL COVER

George Albert Lyon, Detroit, Mich.

Application September 11, 1952, Serial No. 308,971

9 Claims. (Cl. 301—37)

The present invention relates to improvements in wheel structures and more particularly to the ornamental and protective covering of the outer sides of vehicle wheels such as automobile wheels.

An important object of the present invention is to provide an improved wheel structure and cover therefor with novel means for retaining the cover on the wheel.

Another object of the invention is to provide a wheel structure having novel cover retaining means thereon.

A further object of the invention is to provide an improved cover retaining clip structure for vehicle wheels.

Yet another object of the invention is to provide an improved wheel cover and retaining means therefor.

Other objects, features and advantages of the present invention will be readily apparent from the following detailed description of a preferred embodiment thereof taken in conjunction with the accompanying drawings in which:

Figure 1 is a side elevational view of a vehicle wheel structure embodying features of the present invention.

Figure 2 is an enlarged radial sectional view taken substantially on the line II—II of Figure 1; and Figure 3 is a fragmentary side elevational view of the wheel showing one of the retaining spring clips thereon.

As shown on the drawings:

A vehicle wheel with which the present invention may be associated comprises a wheel body 5 having the usual bolt on central flange 7 and an outer marginal flange 8 by which the wheel body is secured in suitable manner to a base flange 9 of a tire rim which also has a side flange 10, an intermediate flange 11 and a terminal flange 12 which merges with the intermediate flange on a shoulder 13. At the juncture of the tire rim and the wheel body, and preferably provided by inset portions of the peripheral body flange 8 are wheel openings 14 to afford ventilation through the wheel. The wheel body may be formed as a heavy gauge sheet metal stamping while the tire rim may be formed as a rolled section. The tire rim is of the multi-flange drop center type adapted to support a pneumatic tire and tube assembly 15.

For covering the outer side of the wheel ornamentally and protectively a cover 17 is provided which is preferably dimensioned to substantially completely overlie the wheel, having a crown portion 18 which overlies the wheel body and a portion of the tire rim, and a marginal trim portion 19 which substantially overlies the remainder of the tire rim.

In the present instance the crown portion 18 and the marginal portion 19 of the cover are separately formed and secured together. To this end, the margin of the crown portion 18 of the cover is provided at its periphery with a generally radially and axially outwardly turned portion 20 providing an annular seat within which is nested an annular underturned complementary inner marginal flange 21 of the trim ring portion 19. The crown cover marginal portion 20 is turned back upon itself to provide a clamping flange 22 by which the underturned flange 21 is fixedly and permanently secured within the seat provided by the cover marginal portion 20. The juncture between the portions of the cover thus provided affords a generally radially and slightly axially outwardly directed stiff reenforcing rib and attachment flange by which the cover is adapted to be secured in snap-on, pry-off relation to the wheel through the medium of retaining clips 23.

According to the present invention, the retaining spring clips 23 are preferably formed of elongated strips of resilient sheet metal such as steel having substantial inherent resiliency, such as a suitable grade of spring steel. Each of the clips 23 has one end portion 24 formed substantially complementary to the generally axially outwardly facing portion of the terminal flange 12 of the tire rim and secured to the terminal flange as by means of a rivet 25. From the end portion 24, the clip extends generally radially inwardly beyond the tire rim shoulder 13 and then axially and radially inwardly in spaced relation to the axially outer portion of the intermediate flange 11.

Opposite the intermediate flange of the tire rim the clip 23 is provided with a cover engaging and retaining intermediate cover retaining recessed portion 27 defined at its axially outer side by cover retaining shoulder 28 while the axially inner side is defined by a generally radially and axially inwardly extending resilient clip portion 29 merging on an arcuate juncture with an end leg portion 30 extending into one of the wheel openings 14 and secured in place as by means of a rivet 31 to the base flange 9 of the tire rim.

It will be observed that the diameter of the retaining shoulder flange of the cover is substantially less than the inner diameter of the tire rim intermediate flange 11. The diameter of the bottom of the cover flange engaging intermediate recess bend 27 of the clip 23 is slightly less than the diameter of the retaining flange. Since each of the clips 23 is secured fixedly adjacent to the extremities of its opposite legs, while the intermediate part of the clips is free from contact with the tire rim, the intermediate portion can readily flex both axially and radially.

In applying the cover 17 to the wheel, the attachment flange rib 20 thereof is placed against the inwardly sloping cam surfaces provided by the outer leg portions of the clips and the cover is pressed axially inwardly to stress the shoulder portions 28 of the clips radially outwardly as permitted by resilient flexure of the intermediate recessed retaining loop portions of the clips, until the retaining flange 20 of the cover snaps behind the shoulder portions 28 of all of the clips. Flexible tension of the clips retainingly grips the cover flange 20 nested in the intermediate cover retaining recesses of the clips. It will be appreciated that as an incident to radial tensioning of the retaining clips 23 there is also a complement of axial tensioning by virtue of the rigid attachment of both of the opposite legs of the clips to the tire rim. There is substantial resistance to either radial or axial flexure of the clips. Hence, the cover 17 is thoroughly retained against unintentional axially outward displacement from the cover and is nevertheless floatingly supported completely out of contact with the wheel. The tensioned retaining clips resist undesirable axial or radial vibrations of the cover in service, while nevertheless permitting axial and radial yielding of the cover as for example when the cover brushes against an unyielding extraneous object such as a curb, stump or the like.

For removing a cover from the wheel, a pry-off tool can be inserted behind the outer extremity margin of the marginal trim ring portion 19 which is reenforced by an underturned reenforcing and finishing flange 32 and in assembly is disposed adjacent to but in spaced air gap relation to the extremity of the terminal flange 12. Pry-off leverage exerted by the pry-off tool will snap the retaining flange 20 of the cover out of engagement from the retaining recess past the shoulder 28 of the adjacent retaining clip or clips. If the retaining clips are unusually resistant to pry-off force, the cover can be partially pried outwardly by engagement of the underturned margin 32 of the cover preliminarily and then engagement of the retaining flange 20 by the tip of the pry-off tool to complete the pry-off.

By having the marginal extremity and the retaining flange 20 of the cover completely spaced from the tire rim, an air circulation gap is provided between the margin of the cover and the tire rim for circulation of air behind the cover and through the wheel openings 14.

It will be understood that modifications and variations may be effected without departing from the scope of the novel concepts of the present invention.

I claim as my invention:

1. In a wheel structure including a wheel body and a tire rim, the tire rim having retaining clips extending generally radially and having opposite leg portions, means for attaching said opposite leg portions fixedly to the tire rim, each of the clips having an intermediate cover-retaining recessed loop portion, and a cover for the outer side of the wheel having a retaining portion engaging in snap-on, pry-off relation with said recessed retaining loop portions of the clips.

2. In a wheel structure including a tire rim having spaced annular flanges, and clips having opposite end portions secured to respective ones of said flanges and having intermediate cover retaining portions, and a cover for the outer side of the wheel having a portion thereof interengageable in snap-on pry-off relation with said intermediate clip portions.

3. In a wheel structure including a tire rim having a base flange and a terminal flange, a clip having end portions respectively secured to said base flange and said terminal flange and an intermediate portion spaced from the tire rim but having a radially inwardly opening retaining recess affording a cover-engaging axially inner seat and an axially outer shoulder interengagable in snap-on, pry-off relation with a portion of a wheel cover.

4. In a wheel structure including a tire rim, a cover for disposition at the outer side of the wheel, and a cover retaining clip having opposite end portions in engagement with the tire rim and an intermediate portion provided with a recess affording spaced generally opposed shoulders for retaining snap-on pry-off engagement with a portion of the cover.

5. In a wheel structure including a tire rim, a spring clip having its opposite end portions in engagement with the tire rim and with its intermediate portion spaced out of contact with the tire rim and providing a generally axially outwardly facing seat for a portion of a cover and an overhanging generally radially and axially inwardly directed retaining shoulder cooperatively spaced from said seat and with a lead-in cam portion sloping outwardly from said shoulder.

6. In a wheel and cover combination, a wheel member, a cover having a circular crown portion and a circular trim portion connected at a generally radially directed annular cover retaining flange therebehind, and a retaining clip having opposite leg portions in engagement with the wheel member and an intermediate cover retaining recessed resilient portion retainingly engageable with said retaining flange of the cover.

7. In a wheel structure including a tire rim, a cover for the outer side of the wheel having a generally radially directed stiff annular engagement flange directed generally radially outwardly, and a cover retaining clip having opposite end portions secured to respectively axially inner and axially outer portions of the tire rim and with an intermediate resilient portion retainingly engaging said flange portion of the cover under both radial and axial tension to support the cover floatingly with respect to the wheel.

8. In a wheel structure including a tire rim, a cover retaining clip of substantial length supported by the tire rim and having intermediate its ends a resilient body portion with a generally radially inwardly opening cover retaining recess therein, and a cover for disposition at the outer side of the wheel having circular flange means directed generally radially outwardly and engageable in snap-on pry-off relation within the clip recess, said clip supporting the cover in spaced substantially floating relation on the wheel.

9. In a wheel structure including a tire rim and wheel body members, a cover retaining clip comprising opposite substantially spaced end portions, means securing said end portions to one of said members with an intermediate portion of the clip spaced from said member, said intermediate portion of the clip being resiliently flexible, and having a pair of generally opposed axially oppositely facing shoulders thereon retainingly engageable with an annular portion of a wheel cover pressed into engagement with the clip.

References Cited in the file of this patent

UNITED STATES PATENTS

| | | |
|---|---|---|
| 2,239,367 | Lyon | Apr. 22, 1941 |
| 2,304,583 | Lyon | Dec. 8, 1942 |
| 2,310,434 | Hyman | Feb. 9, 1943 |
| 2,317,393 | Lyon | Apr. 27, 1943 |
| 2,343,070 | Lyon | Feb. 29, 1944 |
| 2,368,249 | Lyon | Jan. 30, 1945 |
| 2,405,587 | Lyon | Aug. 13, 1946 |
| 2,410,174 | Lyon | Oct. 29, 1946 |